United States Patent
Tran

(10) Patent No.: US 11,510,425 B2
(45) Date of Patent: Nov. 29, 2022

(54) FORMULATIONS FOR EDIBLE BUBBLE SOLUTION

(71) Applicant: Dat Q. Tran, Houstin, TX (US)

(72) Inventor: Dat Q. Tran, Houstin, TX (US)

(73) Assignee: Jason Tiger, Los Angeles, CA (US)

( * ) Notice: Subject to any disclaimer, the term of this patent is extended or adjusted under 35 U.S.C. 154(b) by 0 days.

(21) Appl. No.: 16/327,731

(22) PCT Filed: Jul. 17, 2017

(86) PCT No.: PCT/US2017/042422
§ 371 (c)(1),
(2) Date: Feb. 22, 2019

(87) PCT Pub. No.: WO2018/038823
PCT Pub. Date: Mar. 1, 2018

(65) Prior Publication Data
US 2019/0183147 A1    Jun. 20, 2019

Related U.S. Application Data

(60) Provisional application No. 62/378,829, filed on Aug. 24, 2016.

(51) Int. Cl.
| | | |
|---|---|---|
| A23L 2/40 | (2006.01) | |
| A23L 2/60 | (2006.01) | |
| A23L 29/262 | (2016.01) | |
| A23L 2/68 | (2006.01) | |
| A23L 29/10 | (2016.01) | |
| A23L 29/238 | (2016.01) | |
| A23L 2/54 | (2006.01) | |
| A23L 2/62 | (2006.01) | |
| A23L 29/20 | (2016.01) | |
| A23L 2/52 | (2006.01) | |
| A63H 33/28 | (2006.01) | |

(52) U.S. Cl.
CPC ........ *A23L 2/40* (2013.01); *A23L 2/52* (2013.01); *A23L 2/54* (2013.01); *A23L 2/60* (2013.01); *A23L 2/62* (2013.01); *A23L 2/68* (2013.01); *A23L 29/10* (2016.08); *A23L 29/20* (2016.08); *A23L 29/238* (2016.08); *A23L 29/262* (2016.08); *A23V 2002/00* (2013.01); *A63H 33/28* (2013.01)

(58) Field of Classification Search
CPC . A23L 2/40; A23L 2/54; A23L 29/262; A23L 29/10; A23L 29/238; A23L 2/60; A23L 2/68
See application file for complete search history.

(56) References Cited

U.S. PATENT DOCUMENTS

| | | | |
|---|---|---|---|
| 4,775,348 A | 10/1988 | Collins | |
| 5,246,631 A * | 9/1993 | Halbritter | A63H 33/28 252/700 |
| 6,008,172 A | 12/1999 | Broshi et al. | |
| 6,056,983 A | 5/2000 | Broshi | |
| 6,943,198 B2 | 9/2005 | Pearce | |
| 2004/0126465 A1 | 7/2004 | Lin | |
| 2005/0100648 A1 | 5/2005 | Pearce | |
| 2006/0004110 A1 | 5/2006 | Sabnis et al. | |
| 2008/0160151 A1 | 7/2008 | Zeller et al. | |
| 2011/0059218 A1 * | 3/2011 | Corliss | A23G 9/32 426/534 |
| 2012/0207689 A1 | 8/2012 | Konno et al. | |
| 2012/0244777 A1 | 9/2012 | Sabnis et al. | |
| 2013/0316066 A1 * | 11/2013 | Brown | B01F 15/0256 426/590 |
| 2014/0234488 A1 * | 8/2014 | Chang | A23L 2/38 426/62 |

FOREIGN PATENT DOCUMENTS

| | | |
|---|---|---|
| CN | 102371075 | 3/2012 |
| CN | 102743888 | 10/2012 |
| CN | 102743888 A | 10/2012 |
| CN | 103690394 | 4/2014 |
| JP | 2003038867 A | 2/2003 |
| RU | 2193437 | 11/2002 |
| RU | 2246335 | 2/2005 |
| RU | 2370523 | 10/2009 |
| WO | WO 92/021730 | 12/1992 |
| WO | WO 95/033387 | 12/1995 |
| WO | WO9533387 A1 | 12/1995 |
| WO | WO 97/026076 | 7/1997 |
| WO | WO 98/054276 | 12/1998 |
| WO | WO 2016/011596 | 1/2016 |

(Continued)

OTHER PUBLICATIONS https://www.fda.gov/food/food-additives-petitions/additional-information-about-high-intensity-sweeteners-permitted-use-food-united-states#:~:text=Advantame%20is%20approved%20for%20use,than%20table%20sugar%20(sucrose). (Year: 2018).*

(Continued)

*Primary Examiner* — Katherine D Leblanc
(74) *Attorney, Agent, or Firm* — Cislo & Thomas, LLP

(57) ABSTRACT

Formulations that, when suitably mixed, form edible liquid solutions suitable for blowing bubbles. These formulations contain water, a surfactant, a thickener, a pH adjusting agent/preservative, and optionally a sweetener. The formulations may be provided in either solid form or liquid form, either of which may form an edible bubble solution when mixed with a sufficient quantity of a beverage or similar liquid.

16 Claims, No Drawings

(56) References Cited

FOREIGN PATENT DOCUMENTS

WO    WO2016011596    1/2016

OTHER PUBLICATIONS

International Search Report and Written Opinion prepared by the ISA/U.S. Patent and Trademark Office dated Sep. 11, 2017, for International Patent Application No. PCT/US2017/042422.
Official Action for Australian Patent Application No. 2017316203, dated Jul. 24, 2019, 5 pages.
Official Action and Search Report (with English translation) for Russian Patent Application No. 2019108277, dated Sep. 30, 2019, 12 pages.
"The Edible Bubbles Kit: Create your own bubble snacks!," VAT19, Apr. 13, 2016, retrieved from https://www.vat19.com/item/edible-bubbles-kit, 13 pages.
International Preliminary Report on Patentability for International (PCT) Patent Application No. PCT/US2017/042422, dated Mar. 7, 2019, 10 pages.
"BubbleLick Edible Bubbles Kit," Amazon, Jan. 24, 2016, retrieved from https://www.amazon.com/BubbleLick-Edible-Party-Bubbles-Bottles/dp/B019O794UQ/ref=as_li_ss_t?ie=UTF8&linkCode=sl1&tag=anticm, 11 pages.
Extended European Search Report for European Patent Application No. 17844075.6, dated Mar. 25, 2020, 12 pages.
Notice of Allowance for Australian Patent Application No. 2017316203, dated Feb. 25, 2020, 3 pages.
Search Report and Written Opinion for Singaporean Patent Application No. 11201901489P, dated Dec. 10, 2019, 10 pages.

\* cited by examiner

FORMULATIONS FOR EDIBLE BUBBLE SOLUTION

CROSS REFERENCE TO RELATED APPLICATIONS

The present application is a national stage application under 35 U.S.C. 371 of PCT Application No. PCT/US2017/042422, having an international filing date of Jul 17, 2017, which designated the United States, which PCT application claimed the benefit of U.S. provisional patent application Ser. No. 62/378,829, filed Aug. 24, 2016, both of which are incorporated by reference herein in their entireties.

FIELD OF THE INVENTION

The present invention pertains generally to non-toxic liquid toys and recreational items, and in particular to formulations that, when suitably mixed, form edible liquid solutions suitable for blowing bubbles.

BACKGROUND OF THE INVENTION

A soap bubble (hereinafter simply a "bubble") is a thin film made up of a mixture of soap, or rarely another similar surfactant, and water that encloses air to form a hollow sphere with an iridescent surface. Bubbles have been utilized for entertainment and enjoyment purposes for centuries. In particular, the blowing of bubbles with a pipe or wand is a very popular play activity for young children.

The blowing of bubbles has heretofore generally been done only with prepackaged soap solutions, or with homemade soap solutions. This may be frustrating to children, who may desire to blow bubbles with other liquids, such as beverages. In addition, soap solutions, whether prepackaged or homemade, may pose a danger to very young children, who may attempt to drink the solution or eat the bubbles. Such soap solutions may also be eye irritants, and have an unpleasant taste if swallowed or brought into contact with a user's tongue.

There is thus a desire in the art for a means by which to transform commonplace liquids, such as beverages, into bubble-blowing solutions. There is a further desire in the art for bubble-blowing solutions that are non-toxic and neutral- or pleasant-tasting.

SUMMARY OF THE INVENTION

This disclosure provides a composition, comprising water; between about 1 wt % and about 10 wt % of at least one surfactant; between about 0.5 wt % and about 1.5 wt % of a thickener; and between about 0.05 wt % and about 0.15 wt % of a pH adjusting agent, wherein the at least one surfactant is selected from the group consisting of sodium lauryl sulfate, sodium laureth sulfate, cocamidopropyl betaine, lauramidopropyl betaine, disodium cocoamphodiacetate, caprylyl capryl glucoside, coco glucoside, decyl glucoside, lauryl glucoside, disodium cocoyl glutamate, sodium cocoyl glutamate, sodium lauroyl oat amino acids, cocamidopropyl hydroxysultaine, cocamide DIPA, disodium lauryl sulfosuccinate, cocamide DEA, and mixtures thereof, wherein the thickener is selected from the group consisting of sodium carboxymethyl cellulose, guar gum, xanthan gum, hydroxypropyl cellulose, hydroxyethyl cellulose, carboxymethyl hydroxyethyl cellulose, methyl ethyl cellulose, methyl cellulose, ethyl cellulose, microcrystalline cellulose, polyethylene oxide, and mixtures thereof, and wherein the pH adjusting agent is selected from the group consisting of citric acid, ascorbic acid, acetic acid, and mixtures thereof.

In embodiments, the composition may comprise between about 1 wt % and about 3 wt % of the at least one surfactant, wherein the at least one surfactant is selected from the group consisting of sodium lauryl sulfate, sodium laureth sulfate, and mixtures thereof.

In embodiments, the composition may comprise between about 2 wt % and about 10 wt % of the at least one surfactant, wherein the at least one surfactant is selected from the group consisting of cocamidopropyl betaine, lauramidopropyl betaine, disodium cocoamphodiacetate, and mixtures thereof.

In embodiments, the at least one surfactant may consist of a first surfactant and a second surfactant, wherein the first surfactant is between about 0.5 wt % and about 2 wt % of the composition and the second surfactant is between about 0.5 wt % and about 1.5 wt % of the composition, wherein the first surfactant is selected from the group consisting of sodium lauryl sulfate, sodium laureth sulfate, and mixtures thereof, and wherein the second surfactant is selected from the group consisting of cocamidopropyl betaine, lauramidopropyl betaine, disodium cocoamphodiacetate and mixtures thereof.

In embodiments, the composition may comprise between about 2 wt % and about 10 wt % of the at least one surfactant, wherein the at least one surfactant is selected from the group consisting of caprylyl capryl glucoside, coco glucoside, decyl glucoside, lauryl glucoside, and mixtures thereof.

In embodiments, the composition may comprise between about 2 wt % and about 10 wt % of the at least one surfactant, wherein the at least one surfactant is selected from the group consisting of disodium cocoyl glutamate, sodium cocoyl glutamate, sodium lauroyl oat amino acids, cocamidopropyl hydroxysultaine, cocamide DIPA, disodium lauryl sulfosuccinate, cocamide DEA, and mixtures thereof.

In embodiments, the composition may further comprise a sweetener. The sweetener may be selected from the group consisting of advantame, aspartame, saccharin, stevia, sucralose, acesulfame potassium, neotame, and mixtures thereof, and is between about 0.002 wt % and about 1 wt % of the composition.

In embodiments, the composition may be a liquid under standard conditions.

In embodiments, the composition may form an edible bubble solution when mixed with a beverage in a beverage:composition volume ratio of between about 1:1 and about 2:1.

In embodiments, the composition may be a solid under standard conditions, wherein the edible bubble solution is formed when the composition is mixed with a volume of a beverage sufficient to substantially completely dissolve the composition.

This disclosure also provides a method of forming an edible bubble, comprising: a) mixing a composition of claim 1 with an edible beverage to form a mixed composition; b) suspending a film of the mixed composition over a solid support; and c) directing air over the film suspended on the solid support to create a bubble comprising the mixed composition.

This disclosure further provides an edible bubble formulation, comprising a beverage; and a composition comprising water; between about 1 wt % and about 10 wt % of at least one surfactant; between about 0.5 wt % and about 1.5 wt % of a thickener; and between about 0.05 wt % and about 0.15 wt % of a pH adjusting agent, wherein the at least one surfactant is selected from the group consisting of sodium lauryl sulfate, sodium laureth sulfate, cocamidopropyl betaine, lauramidopropyl betaine, disodium cocoamphodiacetate, caprylyl capryl glucoside, coco glucoside, decyl glucoside, lauryl glucoside, disodium cocoyl glutamate, sodium cocoyl glutamate, sodium lauroyl oat amino acids, cocamidopropyl hydroxysultaine, cocamide DIPA, disodium lauryl sulfosuccinate, cocamide DEA, and mixtures thereof, wherein the thickener is selected from the group consisting of sodium carboxymethyl cellulose, guar gum, xanthan gum, hydroxypropyl cellulose, hydroxyethyl cellulose, carboxymethyl hydroxyethyl cellulose, methyl ethyl cellulose, methyl cellulose, ethyl cellulose, microcrystalline cellulose, polyethylene oxide, and mixtures thereof, and wherein the pH adjusting agent is selected from the group consisting of citric acid, ascorbic acid, acetic acid, and mixtures thereof.

In embodiments, the edible bubble formulation may further comprise a flavoring to enable a user to create a flavored edible bubble. The flavoring may be separately packaged from a solution comprising the beverage and the composition to enable a user to mix a desired quantity of flavoring into the solution, or the flavoring may be provided as a component of a solution comprising the beverage, the composition, and the flavoring.

DETAILED DESCRIPTION OF THE INVENTION

Optionally, the compositions of this disclosure may be mixed with flavoring and/or coloring agents to form colored and/or flavored bubbles, alone or in conjunction with an edible liquid with which they are mixed. Alternatively or additionally, the compositions of this disclosure may comprise one or more flavoring and/or coloring agents to impart colors and/or flavors to bubbles formed with these compositions.

The composition may be supplied as part of a kit that includes an aliquot of a composition of this disclosure and one or more additional kit components, which may include mixing instructions to form an edible bubble solution in conjunction with an edible liquid, a "wand" for use in producing bubbles from any solution created using the kit components, mixing and/or storage containers, beverages miscible with the compositions of this disclosure, and edible flavoring and/or coloring agents.

EXAMPLES

Example 1

Sodium Lauryl Sulfate or Sodium Laureth Sulfate Surfactant Formulation

| Ingredient | Concentration |
|---|---|
| sodium lauryl sulfate (SLS) or sodium laureth sulfate (SLES) | 10-30 mg/ml |
| sodium carboxymethyl cellulose (CMC) or guar gum citric acid | 5-15 mg/ml 0.5-1.5 mg/ml |
| advantame | 0.02-0.2 mg/ml |
| Purified or Distilled Water | qS |

Example 2

Cocamidopropyl Betaine, Lauramidopropyl Betaine or Disodium Cocoamphodiacetate Surfactant Formulation

| Ingredient | Concentration |
|---|---|
| cocamidopropyl betaine, lauramidopropyl betaine or disodium cocoamphodiacetate | 2-10% (volume/volume %) |
| sodium carboxymethyl cellulose (CMC) or guar gum | 5-15 mg/ml |
| citric acid | 0.5-1.5 mg/ml |
| advantame | 0.02-0.2 mg/ml |
| Purified or Distilled Water | qS |

Example 3

Combination of Sodium Lauryl Sulfate or Sodium Laureth Sulfate+Cocamidopropyl Betaine, Lauramidopropyl Betaine or Disodium Cocoamphodiacetate Formulation

| Ingredient | Concentration |
|---|---|
| sodium lauryl sulfate (SLS) or sodium laureth sulfate (SLES) | 5-20 mg/ml |
| cocamidopropyl betaine, lauramidopropyl betaine or disodium cocoamphodiacetate | 0.5-5% (volume/volume %) |
| sodium carboxymethyl cellulose (CMC) or guar gum | 5-15 mg/ml |
| citric acid | 0.5-1.5 mg/ml |
| advantame | 0.02-0.2 mg/ml |
| Purified or Distilled Water | qS |

Example 4

Caprylyl Capryl Glucoside, Coco Glucoside, Decyl Glucoside or Lauryl Glucoside Surfactant Formulation

| Ingredient | Concentration |
|---|---|
| Caprylyl Capryl Glucoside, Coco Glucoside, Decyl Glucoside or Lauryl Glucoside | 2-10% (volume/volume %) |
| sodium carboxymethyl cellulose (CMC) or guar gum | 5-15 mg/ml |
| citric acid | 0.5-1.5 mg/ml |
| advantame | 0.02-0.2 mg/ml |
| Purified or Distilled Water | qS |

Example 5

Disodium Cocoyl Glutamate, Sodium Cocoyl Glutamate, Sodium Lauroyl Oat Amino Acids, Cocamidopropyl Hydroxysultaine, Cocamide DIPA, Disodium Lauryl Sulfosuccinate, or Cocamide DEA Surfactant Formulation

| Ingredient | Concentration |
|---|---|
| Disodium Cocoyl Glutamate, Sodium | 2-10% |

-continued

| Ingredient | Concentration (volume/volume %) |
|---|---|
| Cocoyl Glutamate, Sodium Lauroyl Oat Amino Acids, Cocamidopropyl Hydroxysultaine, Cocamide DIPA, Disodium Lauryl Sulfosuccinate, or Cocamide DEA | |
| sodium carboxymethyl cellulose (CMC) or guar gum | 5-15 mg/ml |
| citric acid | 0.5-1.5 mg/ml |
| advantame | 0.02-0.2 mg/ml |
| Purified or Distilled Water | qS |

Though the foregoing description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

The invention claimed is:

1. A composition, comprising:
water;
between about 1 wt % and about 10 wt % of at least two surfactants;
between about 0.5 wt % and about 1.5 wt % of a thickener;
between about 0.002 wt % and about 1 wt % of a sweetener; and
between about 0.05 wt % and about 0.15 wt % of a pH adjusting agent,
wherein each of the at least two surfactants is selected from the group consisting of sodium lauryl sulfate, sodium laureth sulfate, cocamidopropyl betaine, lauramidopropyl betaine, disodium cocoamphodiacetate, caprylyl capryl glucoside, coco glucoside, decyl glucoside, lauryl glucoside, disodium cocoyl glutamate, sodium cocoyl glutamate, sodium lauroyl oat amino acids, cocamidopropyl hydroxysultaine, cocamide DIPA, disodium lauryl sulfosuccinate, cocamide DEA, and mixtures thereof,
wherein the thickener is selected from the group consisting of sodium carboxymethyl cellulose, guar gum, xanthan gum, hydroxypropyl cellulose, hydroxyethyl cellulose, carboxymethyl hydroxyethyl cellulose, methyl ethyl cellulose, methyl cellulose, ethyl cellulose, microcrystalline cellulose, polyethylene oxide, and mixtures thereof,
wherein the sweetener is selected from the group consisting of advantame, aspartame, saccharin, stevia, sucralose, acesulfame potassium, neotame, and mixtures thereof,
wherein the pH adjusting agent is selected from the group consisting of citric acid, ascorbic acid, acetic acid, and mixtures thereof, and
wherein the composition forms an edible bubble solution when mixed with a beverage in a beverage composition volume ratio of between about 1:1 and about 2:1.

2. The composition of claim 1, comprising between about 1 wt % and about 3 wt % of the at least two surfactants, wherein at least one surfactant is selected from the group consisting of sodium lauryl sulfate, sodium laureth sulfate, and mixtures thereof.

3. The composition of claim 1, comprising between about 2 wt % and about 10 wt % of the at least two surfactants, wherein at least one surfactant is selected from the group consisting of cocamidopropyl betaine, lauramidopropyl betaine, disodium cocoamphodiacetate, and mixtures thereof.

4. The composition of claim 1, wherein the at least two surfactants comprise a first surfactant and a second surfactant,
wherein the first surfactant is between about 0.5 wt % and about 2 wt % of the composition and the second surfactant is between about 0.5 wt % and about 1.5 wt % of the composition,
wherein the first surfactant is selected from the group consisting of sodium lauryl sulfate, sodium laureth sulfate, and mixtures thereof, and
wherein the second surfactant is selected from the group consisting of cocamidopropyl betaine, lauramidopropyl betaine, disodium cocoamphodiacetate and mixtures thereof.

5. The composition of claim 1, comprising between about 2 wt % and about 10 wt % of the at least two surfactants, wherein at least one surfactant is selected from the group consisting of caprylyl capryl glucoside, coco glucoside, decyl glucoside, lauryl glucoside, and mixtures thereof.

6. The composition of claim 1, comprising between about 2 wt % and about 10 wt % of the at least two surfactants, wherein at least one surfactant is selected from the group consisting of di sodium cocoyl glutamate, sodium cocoyl glutamate, sodium lauroyl oat amino acids, cocamidopropyl hydroxysultaine, cocamide DIP A, di sodium lauryl sulfosuccinate, cocamide DEA, and mixtures thereof.

7. The composition of claim 1, wherein the composition is a liquid under standard conditions.

8. The composition of claim 1 wherein the composition is a solid under standard conditions, wherein the edible bubble solution is formed when the composition is mixed with a volume of a beverage sufficient to substantially completely dissolve the composition.

9. A method of forming an edible bubble, comprising:
a) mixing a composition of claim 1 with an edible beverage to form a mixed composition;
b) suspending a film of the mixed composition over a solid support; and
c) directing air over the film suspended on the solid support to create a bubble comprising the mixed composition.

10. An edible bubble formulation, comprising:
a beverage; and
a composition comprising:
water;
between about 1 wt % and about 10 wt % of at least two surfactants;
between about 0.5 wt % and about 1.5 wt % of a thickener;
between about 0.002 wt % and about 1 wt % of a sweetener; and
between about 0.05 wt % and about 0.15 wt % of a pH adjusting agent,
wherein at least one surfactant is selected from the group consisting of sodium lauryl sulfate, sodium laureth sulfate, cocamidopropyl betaine, lauramidopropyl betaine, disodium cocoamphodiacetate, caprylyl capryl glucoside, coco glucoside, decyl glucoside, lauryl glucoside, disodium cocoyl glutamate, sodium cocoyl glutamate, sodium lauroyl oat amino acids, cocamidopropyl hydroxysultaine, cocamide DIPA, disodium lauryl sulfosuccinate, cocamide DEA, and mixtures thereof, wherein the thickener is selected from the group consisting of sodium carboxymethyl cellulose, guar gum, xanthan gum, hydroxypropyl cellulose, hydroxyethyl cellulose, carboxymethyl hydroxyethyl cellulose, methyl ethyl cellulose, methyl cellulose, ethyl cellulose, microcrystalline cellulose, polyethylene oxide, and mixtures thereof, wherein the sweetener is selected from the group consisting of advantame, aspartame, saccharin, stevia, sucralose, acesulfame potassium, neotame, and mixtures thereof, and wherein the pH adjusting agent is selected from the group consisting of citric acid, ascorbic acid, acetic acid, and mixtures thereof, and wherein the beverage and the composition are mixed in a beverage composition volume ratio of between about 1:1 and about 2:1.

11. The edible bubble formulation of claim 10, further comprising a flavoring to enable a user to create a flavored edible bubble.

12. The edible bubble formulation of claim 11, wherein the flavoring is separately packaged from a solution comprising the beverage and the composition to enable a user to mix a desired quantity of flavoring into the solution.

13. The edible bubble formulation of claim 11, wherein the flavoring is provided as a component of a solution comprising the beverage, the composition, and the flavoring.

14. The composition of claim 1, wherein at least one surfactant comprises an anionic surfactant selected from the group consisting of sodium lauryl sulfate, sodium laureth sulfate, and mixtures thereof, and a nonionic surfactant selected from the group consisting of caprylyl capryl glucoside, coco glucoside, decyl glucoside, lauryl glucoside, and mixtures thereof.

15. The edible bubble formulation of claim 10, wherein at least one surfactant comprises an anionic surfactant selected from the group consisting of sodium lauryl sulfate, sodium laureth sulfate, and mixtures thereof, and a nonionic surfactant selected from the group consisting of caprylyl capryl glucoside, coco glucoside, decyl glucoside, lauryl glucoside, and mixtures thereof.

16. An edible bubble formulation, consisting of:
a beverage; and
a composition consisting of:
water;
between about 1 wt % and about 10 wt % of at least one surfactant, wherein the at least one surfactant consists of
(a) between about 1 wt % and about 3 wt % of an anionic surfactant selected from the group consisting of sodium lauryl sulfate, sodium laureth sulfate, and mixtures thereof;
(b) a nonionic surfactant selected from the group consisting of caprylyl capryl glucoside, coco glucoside, decyl glucoside, lauryl glucoside, and mixtures thereof;
between about 0.5 wt % and about 1.5 wt % of a thickener selected from the group consisting of sodium carboxymethyl cellulose, guar gum, and mixtures thereof;
between about 0.05 wt % and about 0.15 wt % of citric acid; and
between about 0.002 wt % and about 1 wt % of aspartame,
wherein the beverage and the composition are mixed in a beverage composition volume ratio of between about 1:1 and about 2:1.

* * * * *